United States Patent [19]
Dilla et al.

[11] Patent Number: 5,478,472
[45] Date of Patent: Dec. 26, 1995

[54] PROCESS FOR TREATING WASTE WATER CONTAINING ORGANIC AND INORGANIC COMPOUNDS

[75] Inventors: Wolfgang Dilla; Helmut Dillenburg; Hans-Georg Krebber; Erich Ploenissen, all of Rheinberg, Germany

[73] Assignee: Solvay Deutschland GmbH, Hannover, Germany

[21] Appl. No.: 235,314

[22] Filed: Apr. 29, 1994

[30] Foreign Application Priority Data

Apr. 29, 1993 [DE] Germany .............. 43 14 108.0

[51] Int. Cl.$^6$ ................ C02F 3/34; C02F 1/02
[52] U.S. Cl. .......... 210/611; 210/612; 210/631; 210/908; 210/919
[58] Field of Search ............. 210/612, 610, 210/611, 614, 620, 631, 908, 909, 919

[56] References Cited

U.S. PATENT DOCUMENTS

| | | | |
|---|---|---|---|
| 3,711,392 | 1/1973 | Metzger | 210/611 |
| 3,923,648 | 12/1975 | Lashley, Jr. | 210/612 |
| 3,961,078 | 6/1976 | Stitt | 210/610 |
| 4,246,104 | 1/1981 | Schmidt et al. | 210/759 |
| 4,334,026 | 6/1982 | Chynoweth | 210/610 |
| 5,429,949 | 7/1995 | Radosevich et al. | 210/612 |

FOREIGN PATENT DOCUMENTS

| | | |
|---|---|---|
| 349708 | 1/1990 | European Pat. Off. . |
| 362934 | 4/1990 | European Pat. Off. . |
| 461785 | 12/1991 | European Pat. Off. . |
| 586998 | 3/1994 | European Pat. Off. . |
| 2232516 | 1/1975 | France . |
| 2332959 | 6/1977 | France . |
| 3620980 | 1/1988 | Germany . |
| 1277632 | 6/1972 | United Kingdom . |
| WO92/05118 | 4/1992 | WIPO . |

*Primary Examiner*—Thomas Wyse
*Attorney, Agent, or Firm*—Evenson, McKeown, Edwards & Lenahan

[57] ABSTRACT

A method for treating waste water which contains organic and inorganic compounds, particularly waste water from the synthesis of epichlorohydrins, in which the waste water is subjected to a) thermal-alkaline treatment,
b) biological treatment, and
c) optionally to chemical-oxidative treatment.

20 Claims, No Drawings

PROCESS FOR TREATING WASTE WATER CONTAINING ORGANIC AND INORGANIC COMPOUNDS

BACKGROUND OF THE INVENTION

This invention relates to a process for treating waste water which contains organic and inorganic substances. In particular the invention relates to treatment of waste water from the production of epichlorohydrin, in which the epichlorohydrin is obtained by reacting dichloropropanol with at least one alkaline compound, preferably an aqueous solution or suspension containing calcium hydroxide, and is separated from the reaction mixture by distillation. In such a process, a waste water remains or can be withdrawn from the synthesis reactor as a bottom product. This waste water contains additional organic, chloro-organic and inorganic compounds as byproducts of the synthesis in addition to very small quantities of the reaction product and the starting material dichloropropanol. This bottom product, which occurs as waste water, typically contains (if calcium hydroxide is used as the alkaline agent in the synthesis of epichlorohydrin) the following compounds: chlorinated, aliphatic, cyclic or alicyclic saturated and/or unsaturated hydrocarbons, saturated and/or unsaturated aliphatic and/or alicyclic chloroethers, chloroalcohols, chloroketones, chloroaldehydes and/or chlorocarboxylic acids, and also, in addition to other compounds which contribute to the COD (chemical oxygen demand) of the waste water, in particular glycerol and glycerol derivatives, and also carboxylic acids, also calcium chloride, calcium carbonate and calcium hydroxide optionally used in excess. The chloro-organic compounds contained in the bottom product contribute to the total AOX (adsorbable organic halogen compound) parameter of the waste water. The AOX is defined as that portion of organic halogen compounds (X=F, Cl, Br, I) which can be adsorbed on activated carbon, the total quantity adsorbed being converted to X=Cl.

The presence of such halogenated organic compounds is a particular problem in the purification of waste water, since the removal of these substances is technically very costly and hence often uneconomic due to the high stability of the covalent carbon-halogen bonds, in particular in the case of $sp^2$-bonded halogens. Known measures for reducing halogenated organic compounds in waste water include chemical-physical and biotechnological processes.

Processes for chemical-physical removal of halo-organic compounds from waste water are used for the main purification or preliminary purification (with subsequent biochemical treatment) of the waste water. Processes which are available for this include, for example, activated carbon purification and special extraction processes. The disadvantage of these processes is that they produce a secondary product (loaded activated carbon or extraction agent) laden with halogenated organic compounds. Activated carbon which is loaded with organic contents from waste water from epichlorohydrin production cannot be adequately regenerated by the known method of treatment with steam or hot inert gases, such as nitrogen.

The decomposition of halogenated organic compounds in the biochemical purification stage of a sewage treatment plant likewise raises various problems. In the first place, many of these compounds are poorly susceptible or resistant to biological decomposition by microorganisms, and on the other hand the concentrations of AOX-producing compounds used in the waste water must not be high, and should have substantially constant values.

Additionally, the volume of the activated sludge in such plants is great, and the enrichment of the organic halogen compounds in the sludge is a further problem, so that chemical-thermal processes are often used to destroy haloorganic compounds in waste waters. These include the so-called wet-oxidative methods, in which halogenated organic compounds are decomposed in an oxidizing atmosphere at high temperatures and considerable pressures. However, this method is expensive.

It is known that the extreme physical conditions of chemical-thermal processes can be moderated by the use of catalytically active compounds, in which case these substances may either pass into the system to be dehalogenated by addition of appropriate reagents, or form as intermediate products during the decomposition reaction.

Examples of substances having high reactivity to organically-bonded halogens which are used include metals, metal hydrides or metal alcoholates alone or in combination with a strong base. The disadvantage of the known chemical-thermal processes is, in addition to their relatively high costs, the frequently long reaction times (often more than 10 hours) and the often only moderate decomposition rates.

Furthermore, methods for treating waste waters from pulp bleaching are known in which the chlorolignin compounds contained in the waste water are partially dehalogenated and/or dehydrohalogenated while maintaining particular temperatures, pH values and residence times (See DE-OS 3 620 980 and U.S. Pat. No. 5,120,448). The methods proposed for treating waste water from pulp bleaching cannot be applied to the treatment of waste water from epichlorohydrin synthesis because the two types of waste water have completely different compositions, so that the process conditions, such as pH value, temperature, pressure and residence time, used to treat waste water from pulp bleaching are not transferrable to the treatment of waste water from the production of epichlorohydrin.

SUMMARY OF THE INVENTION

It was the object of the present invention to provide an improved process for treating waste water contaminated with organic and inorganic substances.

Another object of the invention is to provide a waste water treatment process which is particularly suitable for treating waste water from the synthesis of epichlorohydrins.

A further object of the invention is to provide a waste water treatment process which is simple to carry out, which does not require complicated or expensive apparatus, and which avoids excessive energy costs.

An additional object of the invention is to provide a waste water treatment process with which both the AOX content and the COD value can be reduced.

These and other objects of the invention are achieved by providing a process for treating waste water containing organic and inorganic compounds, wherein the waste water has a pH of 10 to 14 and contains at least 10 mg/liter of adsorbable organic halogen compounds (AOX) and a total of more than 0.10 g/liter of dissolved organic compounds, the process comprising subjecting the waste water to at least one treatment regimen selected from the group consisting of:

a) thermally treating the waste water for at least about ½ hour at a temperature of at least 75° C. and a pressure of at least 1 bar (absolute); adjusting the pH of the thermally treated water to from 7 to 11; and cooling the thermally treated water to a temperature of at most 35° C.; and b) biotreating the waste water for from about 4 to about 25 hours with at least one bacterium selected from the group consisting of Gram-positive bacteria and Gram-negative bacteria at a temperature of at most 35° C.

In accordance with one particularly preferred embodiment of the invention, the objects are achieved by providing a method further comprising adjusting the pH of the waste water as necessary to achieve a pH value of at least 10, and treating the waste water for from about 5 to about 60 minutes at a temperature of at most 35° C. with an ozone-containing gas containing from 1 to 4 grams of ozone per gram of chemical oxygen demand (COD) of the waste water.

According to another preferred embodiment of the invention, the objects are also achieved by providing a method further comprising adjusting the pH of the water as necessary to achieve a pH value of from 6 to 8, and treating the waste water for from about 5 to about 60 minutes at a temperature of at most 35° C. with a mixture of $H_2O_2$ and ozone; in which the mixture comprises 3 to 7 parts by weight $H_2O_2$ per 10 parts by weight ozone and contains 1 to 4 grams of ozone per gram COD of the waste water.

DETAILED DESCRIPTION OF PREFERRED EMBODIMENTS

The invention thus relates to a process in which the waste water emerging or discharged from the reaction vessel, which contains adsorbable organic halogen compounds (AOX) in a quantity of more than 10 mg per liter, typically more than 20 mg per liter, and a total content of dissolved organic substances of more than 0.10 g per liter, undergoes a thermal-alkaline and/or a biological and/or, depending on the purification effect achieved, a thermal-alkaline and/or oxidative treatment.

The waste water, which has a pH value of 10 to 14, preferably 11 to 14 (measured at room temperature), or is set to such a pH value, is introduced into and/or passes through at least one reactor, with a temperature of more than 75° C., preferably 85° C. to 185° C., a pressure of at least 1 bar (absolute), preferably 1 to 10.5 bar (absolute), and a residence time of at least 0.5 hours, preferably 1 to 8 hours, being set or maintained in the reactor. A specific AOX decomposition rate is possible by maintaining or setting the respective sets of parameters. The AOX decomposition rate is dependent, inter alia, on the starting AOX and on the structure of the AOX-producing compounds. The following sets of parameters are intended to illustrate preferred embodiments of the thermal-alkaline treatment stage (see Table 1).

TABLE 1

| Temperature in °C. | Pressure in bar (absolute) | Residence time in hours | pH value measured at room temperature |
|---|---|---|---|
| 125–135 | 2.5–4.0 | 1–8 | 11.5–12.5 |
| 125–135 | 2.5–4.0 | 1–4 | 13–14 |
| 175–185 | 9.0–10.5 | 1–8 | 11.5–12.5 |
| 85–90 | 1.0–1.5 | 1–8 | 11.5–12.5 |
| 155–165 | 5.0–7.4 | 1–8 | 11.5–12.5 |

It has been found that even at relatively low temperatures and pressures and for a pH value setting preferably in the range of 11.5 to 12.5 (measured at room temperature) a considerable reduction in the AOX content in the waste water is possible for residence times of less than 10 hours, which is an advantage of the process according to the invention. Furthermore, it has proved advantageous in the production of epichlorohydrin to use milk of lime with an excess of calcium hydroxide (relative to the theoretically calculated stoichiometric quantity of dichloropropanol required for complete reaction) as the aqueous solution or suspension containing calcium hydroxide, the excess quantity being selected such that the waste water to be treated is already adjusted to a pH value of 11 to 12.5 (measured at room temperature) by the process producing the waste water, and thus already has the necessary pH value for the thermal-alkaline treatment when it emerges from the synthesis reactor. Optionally, in order to adjust the waste water to the pH value according to the invention (measured at room temperature), a corresponding quantity of alkali hydroxide and/or alkaline earth hydroxide, preferably an aqueous calcium hydroxide and/or sodium hydroxide solution, may also be added. The pH value may also be adjusted with a corresponding quantity of alkali carbonate and/or alkali hydrogen carbonate, preferably an aqueous sodium carbonate and/or sodium hydrogen carbonate solution.

Since the waste water exiting from the synthesis reactor contains suspended solids, particularly if an excess of milk of lime is used as the alkaline agent in the production of epichlorohydrin, which may lead to disruptions in the further course of the process, it is advantageous optionally to free the waste water of the suspended solids at least partly before, during and/or after the individual treatment stages by separating or precipitating these solids by corresponding conventional measures. Preferably, this is achieved by chemical reactions, in that for instance suspended calcium hydroxide is dissolved by the addition of hydrochloric acid and/or by mechanical separation processes, such as filtration or sedimentation.

Due to the presence of the aforementioned suspended solids, the stream of waste water which is to be treated is introduced at the head of the reactor or reactors, and the treated waste water is discharged at the bottom of the reactor. Introduction from below with an upward flow could lead to problems of blockage by the suspended solids. However, a flow tube or tubular reactor may also be used to perform the thermal-alkaline treatment stage continuously, with a flow rate of more than 4 meters per second being set in the flow tube or tubular reactor. Preferably the flow rate is 8.5 meters per second. The chloro-organic compounds contained in the waste water are partially dechlorinated and/or dehydrochlorinated by this treatment.

The thermal-alkaline treatment stage a) improves the conditions for the biological decomposition or biochemical decomposition of the remaining organic compounds and the properties of the biological sludge. The microbial decomposition simultaneously also decreases the COD value (chemical oxygen demand) of the waste water. This results from a reaction of the organic compounds dissolved in the waste water by the metabolic action of the microorganisms.

The biological treatment can be carried out aerobically or anaerobically.

The waste water discharged from the reactor with a reduced AOX value is then sent to the biological treatment b). To this end, it is necessary for the pH value to be lowered, so that the waste water is introduced into the biological reactor at a pH value of 7 to 11, preferably 7.5 to 10.5. An acid, preferably hydrochloric acid, can be used to adjust the pH value. It has proved advantageous to free the waste water of solids by filtration or other known mechanical processes before introducing it into the biological stage. The biological treatment takes place in the presence of microorganisms, preferably under aerobic conditions in an activated sludge tank. The biological treatment may be carried out in a single stage or in several stages.

A mixture of Gram-positive bacteria comprising 20 to 98% of the entire biocoenosis and Gram-negative bacteria comprising 2 to 80% of the total biocoenosis is used for the biological treatment of the waste water.

In another embodiment of the process according to the invention, only Gram-positive bacteria are used for the biological treatment of the waste water.

Examples of Gram-positive bacteria which can be used include bacteria of the type Clavibacter Cellulomonas Aureobacterium Microbacterium and/or Curiobacterium, in particular bacteria of the type

*Clavibacter insidiosus/sepedonicum*

*Cellulomonas uda and/or*

*Aureobacterium barkeri.*

Preferably bacteria of the type Alcaligenes, in particular of the type *Alcaligenes xylosoxidans ssp. denitrificans*, are used as Gram-negative bacteria.

The biological treatment stage is operated with an average residence time of 4 to 25 hours, preferably 7 to 18 hours, at a temperature of at most 35° C., i.e., a temperature equal to or less than 35° C.

The biomass content in the activated sludge tank may be 1 to 10 grams/liter, preferably 2 to 6 grams/liter.

The waste water leaving the first treatment stage may optionally be mixed with other waste waters from similar production processes and/or with similar contents before introduction into the biological treatment stage. Thus waste waters from polyol production, vinyl chloride production and/or polyvinyl chloride production may be mixed with that from the first treatment stage and be fed to the biological treatment stage, in which case the pH must be adjusted as necessary to achieve a pH of 9 to 11.

If according to the invention waste water from similar production processes and/or waste water having similar contents is admixed with the waste water leaving the thermal-alkaline treatment stage, a bacteria mixture of Gram-positive bacteria comprising 5 to 90% of the total biocoenosis and Gram-negative bacteria comprising 10 to 95% of the total biocoenosis are used in process stage b). In this embodiment of the invention, preferably bacteria of the type Cellulomonas, in particular bacteria of the type *Cellulomonas uda*, are used as Gram-positive bacteria, and preferably bacteria of the type Pseudomonas or Alcaligenes, in particular bacteria of the type

*Pseudomonas putida*

*Pseudomonas gladioli/cepacia*

*Alcaligenes xylosoxidans* are used as Gram-negative bacteria.

In accordance with another embodiment of the invention, after the biological treatment stage b), depending on the degree of purity achieved, a thermal-alkaline treatment c) according to a) may be repeated, which may then in turn be followed, depending on the degree of purity achieved, by a chemical-oxidative treatment in accordance with d) or dd).

In a further embodiment, it is likewise possible for the waste water which is to be treated to be subjected to biological treatment before thermal-alkaline treatment, and then optionally for ozone treatment to take place.

The biological treatment with the aforementioned species achieves a considerable reduction in the COD value by 80 to 95%. In order to achieve a further reduction in the COD values or the AOX values, the waste water leaving the biological treatment is fed to an oxidative treatment stage d) or dd), preferably an ozone treatment stage, which optionally may also be omitted, namely if the waste water leaving process stage b) or c) meets the required limits of purity.

In one preferred embodiment of the invention, an ozone-containing gas or ozone is added to the waste water which has first undergone thermal-alkaline treatment and then biological treatment, with a pH value of equal to or greater than 10, preferably equal to or greater than 11, (measured at room temperature) being maintained or set in the waste water, and from 1 to 4 grams of ozone, preferably 1.5 to 2.5 grams of ozone, are introduced per gram of COD, and a residence time of 5 to 60 minutes at a temperature of at most 35° C. is maintained.

The adjustment of the pH value which may optionally be necessary can take place with conventional alkaline agents. In particular, the alkaline substances already contemplated for the thermal-alkaline treatment process according to the invention can be used. Preferably sodium hydroxide or calcium hydroxide and/or aqueous solutions or suspensions of these compounds are used. The ozonization of the waste water is preferably carried out at room temperature, in particular at a temperature of at most 35° C. The ozone treatment may, however, also be carried out at elevated temperature. Commercially available ozonization apparatus may be used for ozonization, and these comprise at least one ozone generator, a treatment reactor made of an inert material with suitable apparatus for thoroughly mixing the waste water, and an injector for introducing the ozone into the waste water. The ozone treatment may be carried out in one or more stages. In order to further increase the decomposition efficiency, the water may also be irradiated with UV light during the ozonization. Instead of the ozone treatment, the water may be subjected to oxidative treatment using a mixture of $H_2O_2$ and ozone.

According to another embodiment of the invention, the waste water which has initially undergone thermal-alkaline and then biological treatment is treated at an existing or adjusted pH value of 6 to 8, preferably 6.5 to 7.5, (measured at room temperature) with a mixture of $H_2O_2$ and ozone for an average residence time of 5 to 60 minutes and at a temperature of at most 35° C., the weight ratio of $H_2O_2$ to ozone in the mixture being 0.3 to 0.7 g $H_2O_2$ per gram ozone, preferably 0.5 g $H_2O_2$ per gram ozone, and the mixture containing 1 to 4 g ozone per gram COD, preferably more than 1.5 grams of ozone per gram COD, but less than 2.5 grams of ozone per gram COD.

The multi-stage combination according to the invention of thermal-alkaline treatment with biological and optionally oxidative treatment considerably reduces the content of AOX-producing substances and the COD-producing constituents.

According to the invention, despite the use of conditions which are mild in comparison with known processes, such as the relatively low temperatures and pressures, and short residence times, the chloro-organic compounds can be largely already decomposed in the first treatment stage, i.e. by thermal-alkaline treatment, so that the AOX of a waste water from epichlorohydrin synthesis, which usually has a value of between 25 and 45 mg per liter, can be lowered to less than 4 mg per liter. The subsequent further treatment enables 90% or more of the COD-producing substances to be decomposed, so that in an advantageous case the process stage d) or dd) is not absolutely necessary.

Stage a) of the process according to the invention can be performed continuously or discontinuously. Furthermore, it may be advantageous optionally to cool the waste water before the further treatment in the individual stages.

In order to improve the energy balance of the process according to the invention, it is advantageous to transfer the thermal energy stored in the heated, treated stream of waste water at least partly to a cooler stream of waste water which is still to be processed, with the hot treated stream of waste water being cooled at the same time. A heat exchanger is used for this purpose. Preferably the heat exchange takes place by a direct transfer of the thermal energy by pressure-relief and condensation, in that the hot waste water which is under pressure undergoes pressure-relief, with in particular water vapor being produced, which is introduced into a cooler stream of waste water which is still to be treated and gives off its thermal energy thereto by condensation. During and/or after the heat-up phase, gases and/or vapors are released in the waste water to be treated, in particular steam laden with the more readily volatile organic compounds. This is preferably recycled into the reactor of the epichlorohydrin synthesis.

The following examples are intended to illustrate the invention in further detail without limiting its scope.

EXAMPLE 1

Waste water from epichlorohydrin production having an AOX content of approximately 30 mg/liter, a COD value of approximately 1535 mg/liter and a pH value of 12 (measured at room temperature) was a) subjected in a reactor to thermal-alkaline treatment according to the invention for 4 hours at a temperature of 180° C. and a pressure of 10.2 bar (absolute) and was then adjusted to a pH value of 10.5 (measured at room temperature) with hydrochloric acid and cooled, and b) thereafter subjected in an activated sludge tank to aerobic biological treatment according to the invention in the presence of Gram-positive microorganisms of the type *Clavibacter insidiosus/sepedonicum* and *Aureobacterium barkeri* comprising 50% of the total biocoenosis and Gram-negative microorganisms of the type *Alcaligenes xylosoxidans subspec. denitrificans* comprising 50% of the total biocoenosis at a temperature of 20° C. for an average residence time of 18 hours.

These measures reduced the AOX value of the waste water by more than 90% and also the COD value of the waste water by more than 90%.

EXAMPLE 2

Waste water from epichlorohydrin production, having an AOX value of approximately 40 mg/liter, a COD value of approximately 1000 mg/liter and a pH value of 12 (measured at room temperature) was a) subjected in a reactor to thermal-alkaline treatment according to the invention for 6 hours at a temperature of 100° C. and a pressure of 1.45 bar (absolute) and then adjusted to a pH value of 10.5 (measured at room temperature) with hydrochloric acid and cooled, and b) thereafter subjected in an activated sludge tank to aerobic biological treatment according to the invention in the presence of Gram-positive microorganisms of the type *Clavibacter insidiosus/sepedonicum* and *Aureobacterium barkeri* comprising 50% of the total biocoenosis and Gram-negative microorganisms of the type *Alcaligenes xylosoxidans subspec. denitrificans* comprising 50% of the total biocoenosis at a temperature of 26° C. for an average residence time of 7 hours, and c) subsequently treated in a reactor with 2 grams of ozone per gram COD for an average residence time of 15 minutes, and then filtered to remove residual solids.

These measures decreased the AOX value of the waste water by more than 90% and also the COD value of the waste water by more than 90%.

EXAMPLE 3

Waste water from epichlorohydrin production having an AOX value of approximately 40 mg/liter, a COD value of approximately 1000 mg/liter and a pH value of 12 (measured at room temperature) was a) subjected in a reactor to thermal-alkaline treatment according to the invention for 6 hours at a temperature of 130° C. and a pressure of 3 bar (absolute) and then adjusted to a pH value of 10.5 (measured at room temperature) with hydrochloric acid and cooled, and b) thereafter was subjected to aerobic biological treatment according to the invention in the presence of a mixture of Gram-positive microorganisms at 20° C. and an average residence time of 18 hours.

The microorganism mixture preferably contained bacteria of *Cellulomonas cellulans* and *Aureobacterium barkeri*. These measures decreased the AOX value of the waste water by more than 75% and the COD value of the waste water by more than 85%.

EXAMPLE 4

Waste water from epichlorohydrin production having an AOX value of approximately 40 mg/liter, a COD value of approximately 1000 mg/liter and a pH value of 12 (measured at room temperature) was a) subjected in a reactor to thermal-alkaline treatment according to the invention for 6 hours at a temperature of 130° C. and a pressure of 3 bar (absolute), and then mixed with waste water from vinyl chloride production in a mixture ratio of 4:1, and then the pH value was adjusted to pH 7.5 with hydrochloric acid, and the waste water was cooled, and b) thereafter the waste water was subjected to aerobic biological treatment according to the invention in the presence of Gram-positive microorganisms comprising 40% of the total biocoenosis at a temperature of 20° C. for an average residence time of 10 hours.

Bacteria of the type *Cellulomonas uda* were used as Gram-positive microorganisms, and a bacteria mixture which contained bacteria of the types

*Alcaligenes xylosoxidans,*

*Pseudomonas putida,* and

*Pseudomonas gladioli/cepacia* was used as the Gram-negative microorganisms. These measures decreased the AOX value of the waste water by more than 75% and the COD value of the waste water by more than 85%.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof. Unless otherwise indicated, all pH values in the following claims are measured at room temperature.

What is claimed is:

1. A process for treating waste water containing organic and inorganic compounds, wherein said waste water has a pH of 10 to 14 and contains at least 10 mg/liter of adsorbable organic halogen compounds (AOX) and a total of more than 0.10 g/liter of dissolved organic compounds, said process comprising the steps of:

a) thermally treating the waste water for at least about ½ hour at a temperature of at least 75° C. and a pressure of at least 1 bar (absolute); adjusting the pH of the thermally treated water to from 7 to 11; and cooling the thermally treated water to a temperature of at most 35° C.; and b) biotreating the waste water for from about 4 to about 25 hours with at least one bacterium selected from the group consisting of Gram-positive bacteria and Gram-negative bacteria at a temperature of at most 35° C.

2. A process according to claim 1, wherein said waste water is waste water from the synthesis of epichlorohydrins.

3. A process according to claim 1, for treating a waste water having an initial pH of less than 10, further comprising the step of adjusting the pH of the waste water to at least 10.

4. A process according to claim 1, wherein said waste water is biotreated according to step b) further comprising c) adjusting the pH of the biotreated water as necessary to achieve a pH of at least 10 and then subjecting the water to a subsequent thermal treatment step corresponding to regimen a).

5. A process according to claim 1, further comprising d) adjusting the pH of the water as necessary to achieve a pH of at least 10, and then treating the waste water for from about 5 to about 60 minutes at a temperature of at most 35° C. with an ozone-containing gas containing from 1 to 4 grams of ozone per gram of chemical oxygen demand (COD) of the waste water.

6. A process according to claim 1, further comprising dd) adjusting the pH of the waste water as necessary to achieve a pH of from 6 to 8, and then treating the water for from about 5 to about 60 minutes at a temperature of at most 35° C. with a mixture of $H_2O_2$ and ozone; said mixture comprising from 3 to 7 parts by weight $H_2O_2$ per 10 parts by weight ozone and containing from 1 to 4 grams of ozone per gram COD of the waste water.

7. A process according to claim 1, wherein said waste water is thermally treated according to step a) for from about 1 to about 8 hours at a pH value of 11 to 14, a temperature of 85° to 185° C., and a pressure of 1.0 to 10.5 bar (absolute).

8. A process according to claim 1, wherein said waste water is biotreated according to step b) with Gram-positive bacteria comprising 20 to 98% of the total biocoenosis and Gram-negative bacteria comprising 2 to 80% of the total biocoenosis.

9. A process according to claim 1, wherein said waste water is biotreated according to step b) with only Gram-positive bacteria.

10. A process according to claim 9, wherein said Gram-positive bacteria are selected from the group consisting of Clavibacter
    Cellulomonas
    Aureobacterium
    Microbacterium, and
    Curiobacterium.

11. A process according to claim 1, wherein said waste water is biotreated according to step b) with Gram-positive bacteria and Gram-negative bacteria.

12. A process according to claim 11, wherein said Gram-positive bacteria are selected from the group consisting of Clavibacter, Cellulomonas, Aureobacterium, Microbacterium and Curiobacterium, and said Gram-negative bacteria are bacteria of the genus Alcaligenes.

13. A process according to claim 1, wherein said waste water is biotreated according to step b) for from about 7 to about 18 hours.

14. A process according to claim 1, comprising thermally treating said waste water according to step a); mixing the thermally treated waste water with additional waste water from polyol production, vinyl chloride production or polyvinyl chloride production; and thereafter biotreating said waste water according to step b).

15. A process according to claim 14, wherein said waste water is biotreated according to step b) with Gram-positive bacteria comprising 5 to 90% of the total biocoenosis and Gram-negative bacteria comprising 10 to 95% of the total biocoenosis.

16. A process according to claim 15, wherein said waste water is biotreated according to step b) with Gram-positive bacteria of the genus Cellulomonas and with Gram-negative bacteria of the genus Pseudomonas or Alcaligenes.

17. A process according to claim 1, wherein said waste water is biotreated according to step b), further comprising adjusting the pH of the biotreated water to at least pH 10.5, and thereafter treating the waste water for from about 5 to about 60 minutes at a temperature of at most 35° C. with an ozone-containing gas containing from 1 to 4 grams of ozone per gram of chemical oxygen demand (COD) of the waste water.

18. A process according to claim 5, wherein the waste water treated with from 1.5 to 2.5 grams of ozone per gram COD of the waste water.

19. A process according to claim 1, wherein said waste water is biotreated according to step b); further comprising adjusting the pH of the waste water as necessary to obtain a pH of 6.5 to 7.5, and thereafter treating the waste water with mixture of $H_2O_2$ and ozone; said mixture containing from 1.5 to 2.5 grams of ozone per gram COD of the water and about 0.5 gram of $H_2O_2$ per gram of ozone.

20. A process according to claim 1, further comprising subjecting the waste water to chemical, mechanical or chemical and mechanical treatment to remove suspended solids.

* * * * *